United States Patent
Kondo et al.

(10) Patent No.: US 7,948,742 B2
(45) Date of Patent: May 24, 2011

(54) PLANAR DISPLAY DEVICE

(75) Inventors: Nobuyoshi Kondo, Miyazaki (JP); Takashi Sasaki, Miyazaki (JP); Akira Otsuka, Miyazaki (JP)

(73) Assignee: Fujitsu Hitachi Plasma Display Limited, Miyazaki (JP)

( * ) Notice: Subject to any disclaimer, the term of this patent is extended or adjusted under 35 U.S.C. 154(b) by 1002 days.

(21) Appl. No.: 11/721,095

(22) PCT Filed: Jul. 11, 2005

(86) PCT No.: PCT/JP2005/012770
§ 371 (c)(1),
(2), (4) Date: Jun. 7, 2007

(87) PCT Pub. No.: WO2007/007391
PCT Pub. Date: Jan. 18, 2007

(65) Prior Publication Data
US 2009/0224648 A1 Sep. 10, 2009

(51) Int. Cl.
*G06F 1/16* (2006.01)
*G02F 1/1333* (2006.01)
*H01J 9/24* (2006.01)

(52) U.S. Cl. ......... 361/679.21; 361/679.22; 361/679.26; 345/905; 349/58; 445/23

(58) Field of Classification Search .............. 349/58–60; 445/23; 313/44; 345/905, 66; 348/748; 361/679.01–679.45, 679.55–679.59
See application file for complete search history.

(56) References Cited

FOREIGN PATENT DOCUMENTS

| JP | 06-020250 | 3/1994 |
|---|---|---|
| JP | 09-045148 | 2/1997 |
| JP | 2002-050295 | 2/2002 |
| JP | 2002-068294 | 3/2002 |
| JP | 2002-123186 | 4/2002 |
| JP | 2002-123187 | 4/2002 |
| JP | 2002123186 A * | 4/2002 |
| JP | 2003-070533 | 3/2003 |
| JP | 2004-002548 | 1/2004 |
| JP | 2004-004705 | 1/2004 |
| JP | 2004-029630 | 1/2004 |
| JP | 2004002548 A * | 1/2004 |
| JP | 2004-111092 | 4/2004 |
| JP | 2004-184677 | 7/2004 |
| JP | 2004-309547 | 11/2004 |
| JP | 2004-309549 | 11/2004 |
| JP | 2004-333904 | 11/2004 |
| JP | 2004309547 A * | 11/2004 |

* cited by examiner

*Primary Examiner* — Zachary M Pape
*Assistant Examiner* — Nidhi Desai
(74) *Attorney, Agent, or Firm* — Antonelli, Terry, Stout & Kraus, LLP.

(57) ABSTRACT

A planar display device whose display panel main body can be easily separated from a chassis member upon disposal without preparing large equipment and a special tool. In the planar display device wherein the PDP panel main body (1) and the chassis member (2) are adhered by a two-sided tape (3), a wire (4) is previously incorporated for separating the PDP panel main body (1) from the chassis member (2) by cutting and peeling the double-sided tape.

2 Claims, 8 Drawing Sheets

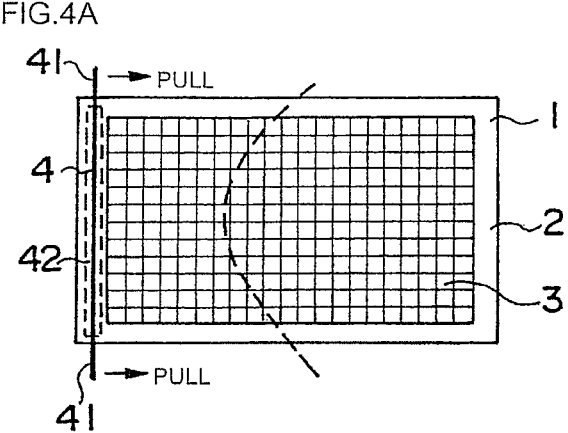
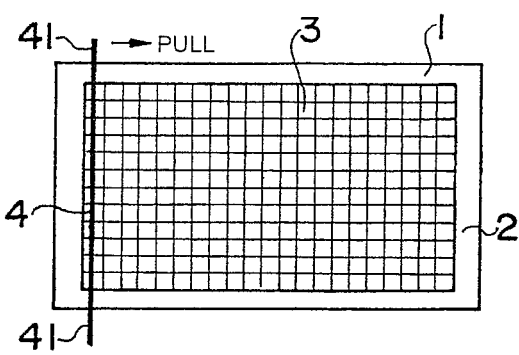

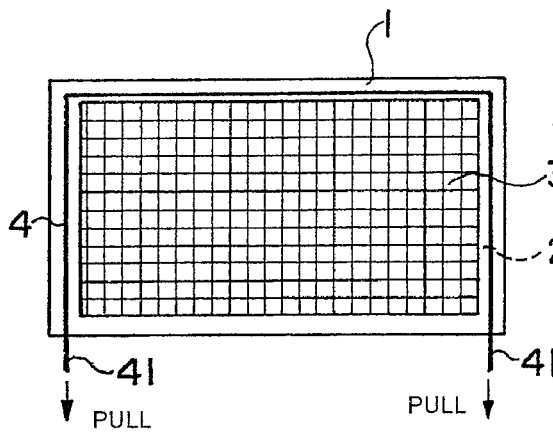
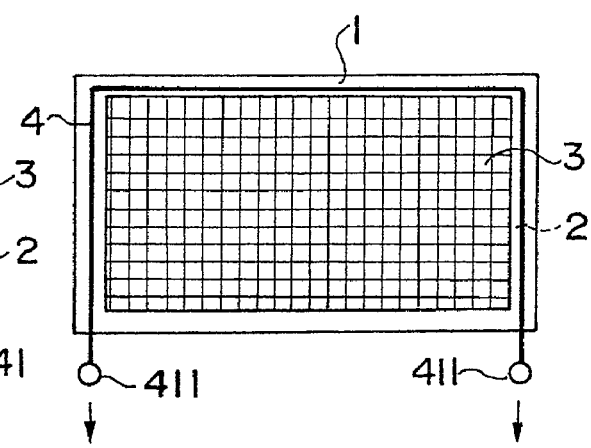

PLANAR DISPLAY DEVICE

TECHNICAL FIELD

The present invention relates to a planar display device which facilitates separation of a display panel (flat panel display) mainly composed of glass from a metal plate (retention mechanism) to which the display panel is attached and a method of separation thereof.

BACKGROUND ART

There are various planar display devices under development, such as a PDP display device, a liquid crystal display, an EL display device and an FED (Field Emission Device) display device. Displays (display panels) of those planar display devices are mainly composed of glass. For this reason, a planar display element composed of the glass is rigidly fixed on a chassis base (retention mechanism) composed of a metal plate such as aluminum or iron by using a two-sided tape for the purposes of securing strength and radiation. To fix the display panel composed of the glass on the chassis base, it normally requires the strength for making it hardly separable so as to be rigidly attached and fixed.

In recent years, it is becoming increasingly obligatory, from an environmental viewpoint, to separate materials and make cyclical use of reusable materials when disposing of these planar display devices. Under these circumstances, it has been considered that there is a necessity to have a technique of separating the display panel from the metal plate upon disposal in the case of a large-size planar display device of which one side exceeds 1 m. To be more specific, the chassis base includes aluminum and iron as its main components so that it can be easily recycled as-is. However, a PDP panel body includes lead and other chemical substances so that it needs to undergo a special process.

To separate the display panel from the chassis base, the two-sided tape must be cut or peeled in one way or another. As the two-sided tape have strong adhesion (attachment), however, it is difficult to separate the PDP panel body from the chassis base by a normal method.

As one of the techniques thereof, there is a proposed technique wherein a display panel body and a metallic chassis base for attaching the display panel body with an adhesive and thereby retaining it are provided, a heat generating member is placed in an adhesive material, and the adhesive is melted or degraded by heat of the heat generating member to reduce the attachment when separating the display panel body from the chassis base (Patent Document 1).

There is also a proposed technique wherein there are provided a display panel including multiple discharge cells and a chassis base for attaching a thermal conduction sheet to a back side of the display panel and thereby retaining the display panel, and the thermal conduction sheet is constituted by forming an adhesion layer on both faces of a thermally-conductive porous insulator sheet. And when attaching the display panel to the chassis base via the thermal conduction sheet, the thermal conduction sheet is attached to a front face of the chassis base first and then the back side of the display panel is lapped on the thermal conduction sheet of the chassis base so as to attach the display panel to the chassis base by means of the thermal conduction sheet. And when separating the display panel from the chassis base, cutting is performed by putting a cutting member through the porous insulator sheet portion of the attached sheet (refer to Patent Document 2 for instance).

There are also proposals of a method of cutting an adhesive layer between the display panel body and the chassis base by using a bandsaw and a wire (refer to Patent Documents 3 and 4 for instance), a method of heating the display panel body and the chassis base with electricity from a high-frequency power source and melting and peeling off the adhesive layer (refer to Patent Document 5 for instance), a method of attaching the display panel body to the chassis base by placing a pyroconductive member composed of a ductile peeling adhesive in a coasting manner, and reducing the attachment by pulling an end of the ductile peeling adhesive to separate them on peeling off (refer to Patent Document 6 for instance), and the like.

Patent Document 1: Japanese Patent Laid-Open Publication No. 2002-123187
Patent Document 2: Japanese Patent Laid-Open Publication No. 2004-4705
Patent Document 3: Japanese Patent Laid-Open Publication No. 2004-29630
Patent Document 4: Japanese Patent Laid-Open Publication No. 2004-184677
Patent Document 5: Japanese Patent Laid-Open Publication No. 2004-111092
Patent Document 6: Japanese Patent Laid-Open Publication No. 2004-309547

According to the method described in Patent Document 1, the heat generating member is exposed at the end of the panel so that this portion needs to be processed. According to the method described in Patent Document 2, the cutting member needs to be put through the insulator sheet portion on cutting. According to the methods described in Patent Documents 3 to 5, it is necessary to provide equipment such as a saw device, a special tool or a high-frequency power source at a place for performing the disposal. Furthermore, according to the method described in Patent Document 6, a large amount of a particular kind of tape is used. Therefore, not only manufacturing cost becomes high but there is also a possibility that unevenness may occur in heat transfer between the PDP panel body and the chassis base to affect the screen, and besides, the ductile peeling adhesive may run out on peeling to disable the peeling.

The present invention solves the conventional technical problems, and an object thereof is to provide a planar display device which facilitates separation of the display panel body from the chassis base on disposal without preparing large-size equipment or a special tool. Another object of the present invention is to provide a planar display device of a low manufacturing cost, which does not use a particular kind of two-sided tape but uses an inexpensive wire.

DISCLOSURE OF THE INVENTION

Concerning the problems, the present invention has a wire for separation incorporated in advance in an adhesion layer for attaching a metal portion of the chassis base to a rear glass portion of the display panel.

To be more specific, the present invention provides a planar display device having a flat panel display attached to a retention mechanism with an adhesive material, wherein separation means for separating the flat panel display from the retention mechanism by shearing off and peeling off the adhesive material is incorporated in advance.

The present invention also provides a planar display device having a plasma display element attached to a retention mechanism with an adhesive material, wherein: separation means for separating the plasma display element from the retention mechanism by shearing off and peeling off the adhesive material is incorporated in advance.

The present invention also provides the planar display device, wherein the separation means is a thin corded member of high-tensile strength and has a holding mechanism at an extremity thereof. The present invention also provides the planar display device including a plurality of the separation means.

The present invention also provides the planar display device, wherein the separation means is embedded in the adhesive material or placed outside the adhesive material. The present invention also provides the planar display device wherein it is placed between the flat display element and the retention mechanism. Furthermore, the present invention provides the planar display device wherein the separation means is placed approximately in parallel with one side or multiple sides of the adhesive material. Furthermore, the present invention provides the planar display device wherein the separation means is placed to sequentially separate the adhesive material in blocks.

The present invention provides a separation method of a planar display device having a flat panel display attached to a retention mechanism with an adhesive material, including separation means for separating the flat panel display from the retention mechanism by shearing off and peeling off the adhesive material incorporated therein in advance, wherein the flat panel display is separated from the retention mechanism by pulling an end or an exposed portion of the separation means.

According to the present invention, it is possible to easily disassemble the display panel and a metal plate when disposing of the panel composed of glass attached to the metal plate.

BRIEF DESCRIPTION OF THE DRAWINGS

FIG. 4 are plan views for describing the structure of the PDP module according to the present invention;

FIG. 6 are diagram for describing another placement example of a wire of the PDP module according to the present invention;

DESCRIPTION OF SYMBOLS

Figure 1:
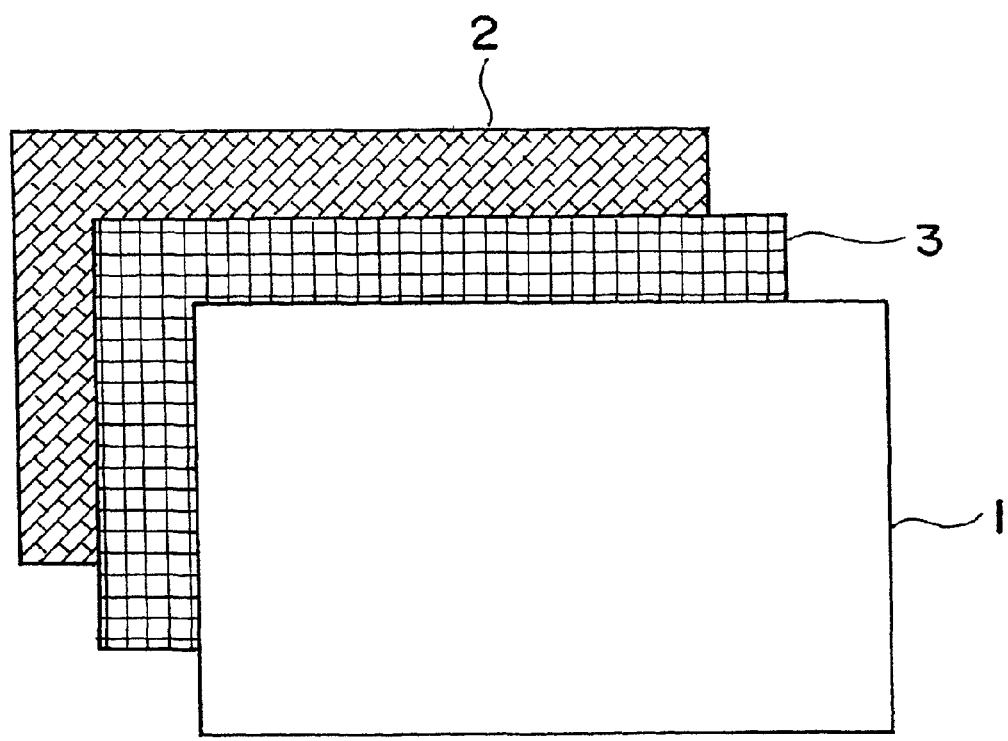
FIG. 1 is a diagram for describing an overview of a structure of a PDP module to which the present invention is applied.

1 PDP panel body
11 Front glass plate
111 X electrode
112 Y electrode
113 Dielectric layer
114 Protective layer
12 Rear glass plate
121 Address electrode
122 Dielectric layer
123 Barrier rib
124 Phosphor
2 Chassis base
21 X drive circuit
22 Y drive circuit
23 Address drive circuit
24 Power supply
25 Control circuit
3 Two-sided tape
4 Wire
41 End
411 Ring
42 Adhesive tape

BEST MODE FOR CARRYING OUT THE INVENTION

Hereunder, embodiments of the present invention will be described by using FIGS. 1 to 8 and taking a plasma display (may be abbreviated as a PDP hereafter) device as an example. An overview of a configuration of the PDP device according to the present invention will be described by using FIG. 1. The PDP device is configured by attaching a PDP panel body (flat panel display) 1 to a chassis base (retention mechanism) 2 such as an aluminum plate by using a two-sided adhesive tape (adhesive material) 3. To securely retain the PDP panel body 1 as heavy as several Kg to over 10 Kg on the chassis base 2 and maintain sufficient adhesive strength until the end of life of the PDP panel several years later, the two-sided tape 3 uses a strong and stable material which is slightly smaller than but approximately the same size as the PDP panel body 1 or the chassis base 2. An acrylic form material is used as the material of a substrate of the two-sided tape 3, and so sufficient strength can be secured even if the adhesive strength is reduced by a temperature rise due to heat generation of circuits mounted on the PDP panel and chassis base. Furthermore, the two-sided tape 3 is attached to the entire backside of the PDP panel body 1 to be able to evenly transfer the heat generated by the PDP panel body 1 to the chassis base 2.

Figure 2:
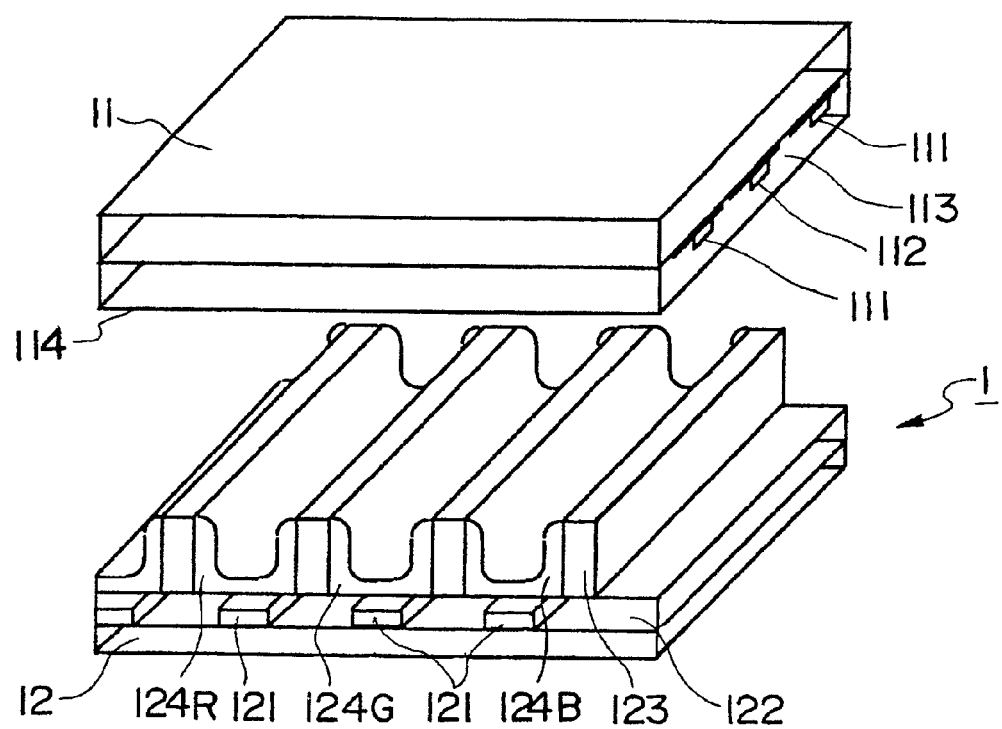
FIG. 2 is an exploded perspective view for describing the structure of a PDP panel body.

The exploded perspective view of FIG. 2 will be used to describe an example of the structure of the PDP panel body 1 according to the present invention. X electrodes 111 and Y electrodes 112 for repeatedly discharging are alternately placed in parallel on a front glass plate 11 composed of glass. This electrode group is covered by a dielectric layer 113, and a surface thereof is further covered by a protective layer 114 such as MgO. Address electrodes 121 are placed on a rear glass plate 12 composed of glass as with the front glass plate 11 in a direction almost vertical to the X electrodes 111 and Y electrodes 112, and are further covered by a dielectric layer 122. Barrier ribs 123 are placed on both sides of the address electrode 121 to segment cells in the row direction. Furthermore, phosphors 124R, 124G and 124B for generating red (R), green (G) and blue (B) visible rays when excited by ultraviolet light are applied to side faces of the dielectric layer 122 and barrier ribs 123 on the address electrode 121. The front glass plate 11 and the rear glass plate 12 are attached together so that the protective layer 114 contacts a top face of the barrier ribs 123 so as to encapsulate discharge gases such as Ne and Xe and configure the panel.

Figure 3:
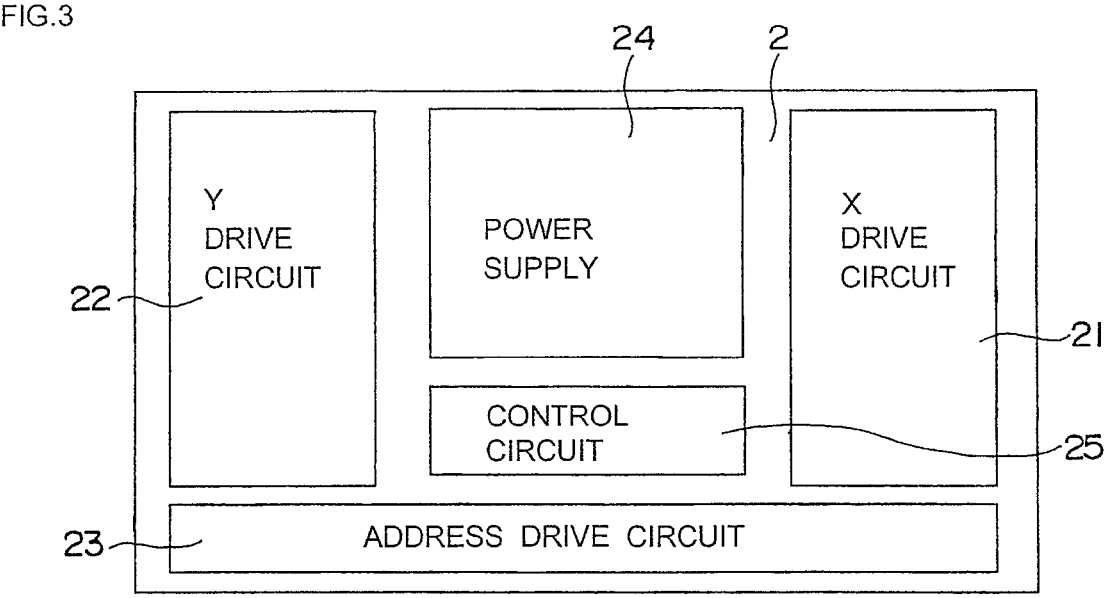
FIG. 3 is a diagram for describing the structure of a back side of the PDP module according to the present invention.

The configuration of the PDP module backside will be described by using FIG. 3. The chassis base 2 is composed of a metal plate provided on the backside of the rear glass plate 12 of PDP. The chassis base 2 is configured by an X drive circuit 21 for applying voltage to the X electrodes 111, a Y drive circuit 22 for applying voltage to the Y electrodes 112, an address drive circuit 23 for applying voltage to the address electrodes 121, a power supply 24 of the drive circuits, and a control circuit 25 for controlling them.

An overview of the configuration of the PDP module including separation means according to the present invention will be described by using FIG. 4. FIG. 4(A) is a diagram of the PDP module viewed from the front, where the PDP panel body 1 and the chassis base 2 are shown overlapping with each other while the two-sided tape 3 is shown in a netted pattern. FIG. 4(A) shows the PDP panel body 1 and the chassis base 2 in the same size to simplify the description. According to the present invention, a wire 4 is fixed by an adhesive tape 42 in proximity to an end of a plane of the chassis base 2 opposed to the PDP panel body 1 for instance. The wire 4 is a thin corded member of high-tensile strength, such as a piano wire or a fishing gut. Both ends (extremities) 41 of the wire 4 are exposed outside the PDP panel body 1 and the chassis base 2 to have a length easily graspable in use by a worker. In a state of a product, the ends are folded, for instance, so as not to be exposed outside.

On disposal, the worker separates the PDP panel body 1 from the chassis base 2 by holding the end 41 of the wire 4 and pulling it to the right as in the drawing to shear off the two-sided tape 3 or peel off a bonding plane with the PDP panel body 1 or the chassis base 2.

Another placement example of the wire 4 will be described by using FIG. 4(B). In this example, the wire 4 is suppressed by a part of the two-sided tape 3 so that the adhesive tape 42 can be omitted. In this example, a portion left unpeeled exists at the left extremity even after pulling the wire 4 to the right extremity and shearing off or peeling off the two-sided tape 3. As its adhesion area is small, however, it can be easily separated by holding the PDP panel body 1 and chassis base 2 with both hands peeling it off.

Figure 5A:
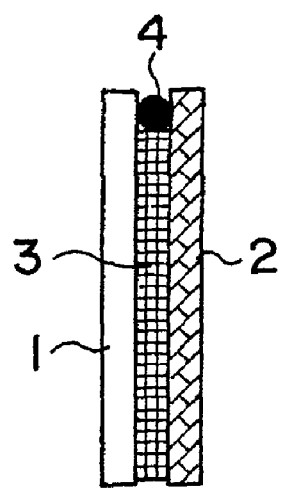
FIG. 5 are diagrams for describing a state of shearing and peeling of the PDP module according to the present invention.
Figure 5B:
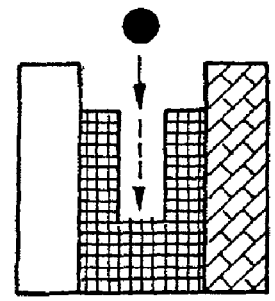
Figure 5C:
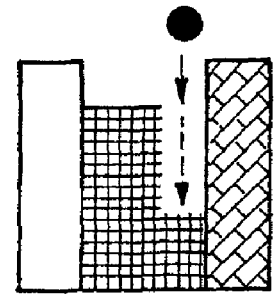

The states of shearing and peeling of the two-sided tape 3 will be described by using FIG. 5. FIG. 5(A) is a diagram of the PDP module viewed from the top face, where the PDP panel body 1 and the chassis base 2 are attached and fixed by the two-sided tape 3 while the wire 4 is placed on an end face of the two-sided tape 3. FIG. 5(B) shows the state in which the wire 4 shears off the two-sided tape 3. And FIG. 5(C) shows the state in which the wire 4 peels the two-sided tape 3 off the chassis base 2. Both the shearing and peeling exist in actual work. In FIG. 5, separation work becomes easier by moving the wire 4 up and down in a vertical direction of a page while pulling it downward.

A further placement example of the wire 4 will be described by using FIG. 6. FIG. 6(A) is an example in which the wire 4 is placed outside three sides of the two-sided tape 3, where the PDP panel body 1 is separated from the chassis base 2 by pulling both ends 41 of the wire 4 downward as in the drawing. FIG. 6(B) is an example in which a holding mechanism such as a ring 411 is provided at the end of the wire 4 so as to make the wire easily graspable during the work. It is also effective in other placement examples of the wire to provide the holding mechanism such as the ring 411 at the end 41 of the wire 4.

Figure 7:
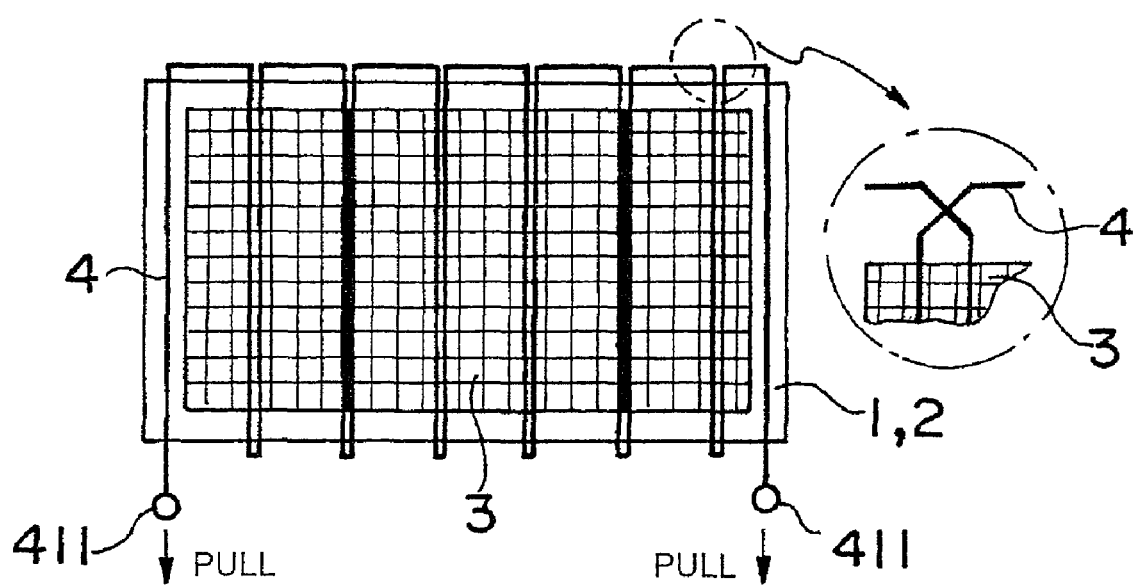
FIG. 7 is a diagram for describing a further placement example of the wire of the PDP module according to the present invention.

A still further placement example of the wire 4 will be described by using FIG. 7. In this example, the wire 4 is placed like teeth of a comb drawn with one stroke at a portion of the two-sided tape 3. It is possible, by pulling the ends 411 of the wire 4 downward, to sequentially peel off the two-sided tape 3 from its right and left reed-shaped portions (in blocks) so as to cleanly peel off the entirety. Intervals of folded portions of the wire 4 are reduced as much as possible so as to lessen the portions left unpeeled. It is also possible, as in the circled partially enlarged view, to render an upper end of the folded portions of the wire 4 as a crossing loop and thereby lessen or further eliminate the portions left unpeeled.

Figure 8:
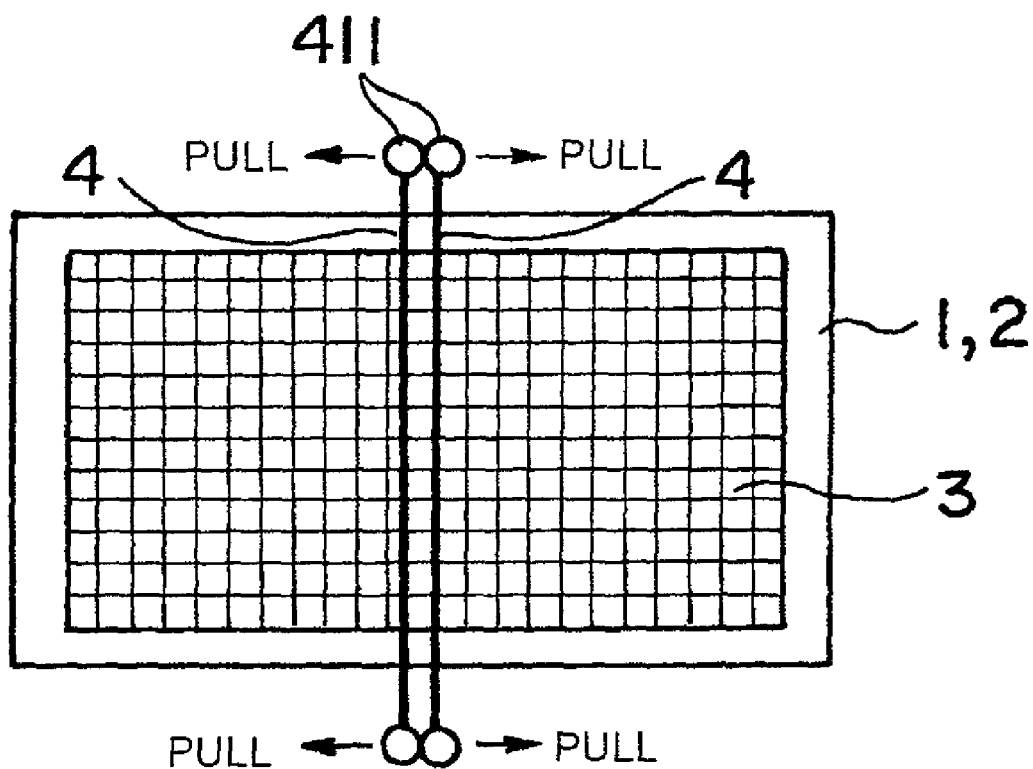
FIG. 8 is a diagram for describing a still further placement example of the wire of the PDP module according to the present invention.

A still further placement example of the wire 4 will be described by using FIG. 8. In this example, two wires 4 are placed in a horizontal central part of the two-sided tape 3 so that the peeling is performed by pulling each of the wires 4 outward.

According to the present invention, the wire 4 may be either embedded in the two-sided tape 3 or placed outside the two-sided tape 3. It may also be placed between the two-sided tape 3 and the PDP panel body 1 or the chassis base 2.

The wire 4 is placed approximately in parallel with one side or multiple sides of the two-sided tape 3.

As described above, according to the present invention, it is possible, by placing the wire 4 at least at one location of edges of the two-sided tape 3 attaching the PDP panel body 1 to the chassis base 2, to easily separate the PDP panel body 1 from the chassis base 2 on disposal without using large-size equipment or a special tool.

The invention claimed is:

1. A planar display device having a flat panel display attached to a retention mechanism with an adhesive material, characterized in that separation means having a wire placed like teeth of a comb drawn with one stroke which divides the adhesive material into a plurality of reed-shaped blocks when viewed from a perpendicular direction with respect to the flat panel display enables separation of the flat panel display from the retention mechanism by pulling at least one end of the wire placed outside the adhesive material so as to enable sequential shearing off and peeling off of the adhesive material in blocks, folded portions of the wire being placed outside of the adhesive material, intervals of the folded portions of the wire being narrower than a width of the reed-shaped blocks, and ends of the folded portions of the wire being formed as a crossing loop.

2. A separation method of a planar display device having a flat panel display attached to a retention mechanism with an adhesive material, including the steps of:
   separating the flat panel display from the retention mechanism by shearing off and peeling off the adhesive material incorporated therein in advance with a separation means;
   utilizing as the separation means a wire placed like teeth of a comb drawn with one stroke so as to divide the adhesive material into a plurality of reed-shaped blocks when viewed from a perpendicular direction with respect to the flat panel display;
   placing folded portions of the wire outside of the adhesive material;
   forming intervals of the folded portions of the wire so as to be narrower than a width of the reed-shaped blocks;
   forming ends of the folded portions of the wire as a crossing loop; and
   utilizing the separation means to separate the flat panel display from the retention mechanism by pulling at least one end of the wire which is placed outside of the adhesive material so as to enable sequential shearing off and peeling off of the adhesive material in blocks.

* * * * *